United States Patent [19]

Mobius

[11] 4,073,954
[45] Feb. 14, 1978

[54] METHOD OF REMOVING TANNINS AND REDUCING CLOUDING IN DRINKS

[76] Inventor: Christian Hermann Mobius, 23 Sudetenstr., Geisenheim, Germany, 6222

[21] Appl. No.: 654,920

[22] Filed: Feb. 3, 1976

[51] Int. Cl.$^2$ ............................................. C12H 1/04
[52] U.S. Cl. .................................. 426/330.3; 210/24; 426/271; 426/330.5; 426/422
[58] Field of Search ...................... 426/271, 422–424, 426/330, 330.2, 330.3, 330.4, 330.5; 210/24

[56] References Cited

U.S. PATENT DOCUMENTS

| 3,245,804 | 4/1966 | Heggaard | 426/422 X |
| 3,436,225 | 4/1969 | Raible | 426/423 X |
| 3,512,988 | 5/1970 | Yomo et al. | 426/330 X |
| 3,597,351 | 8/1971 | Landenberg | 426/271 X |
| 3,878,300 | 4/1975 | Milligan | 426/271 X |

FOREIGN PATENT DOCUMENTS

| 528,402 | 7/1956 | Canada | 426/271 |
| 625,730 | 8/1961 | Canada | 426/271 |
| 975,733 | 11/1964 | United Kingdom | 426/422 |
| 808,432 | 2/1959 | United Kingdom | 426/422 |

OTHER PUBLICATIONS

Condensed Chem. Dict., 1971, 8th ed., Van Nostrand Rheinhold Co.

*Primary Examiner*—Steven L. Weinstein
*Attorney, Agent, or Firm*—Finnegan, Henderson, Farabow & Garrett

[57] ABSTRACT

A method for removing tannins from liquid fruit drinks, vegetable drinks, and fermented liquids of vegetable and fruit origin which comprises contacting the liquid with at least one highly dispersed polymer obtained by condensing a monomer selected from the group consisting of polyamino compounds, polyhydroxy compounds and mixtures thereof, with formaldehyde. Polymers useful in the method of the invention should have a specific surface area of over 20m$^2$/g and a positive zeta potential in a solution having a pH of from 3 to 5. The polymers of the invention may be easily separated from the contacted liquid using standard filtration techniques.

10 Claims, No Drawings

METHOD OF REMOVING TANNINS AND REDUCING CLOUDING IN DRINKS

With all juices and fermented drinks there is known to be a risk that the drinks may become cloudy after long storage. A wide variety of technological measures have been applied in an attempt to counter this risk, since cloudiness in many cases diminishes the value of the drink, as in the case of beer or wine.

The cloudiness may be of a biological or non-biological nature. Measures for avoiding biological clouding are known nowadays and, given appropriate operation, such clouding can be avoided by the technology applied.

Non-biological clouding may be brought about by various constituents of the drink. Usually all turbidity-forming constituents are involved in clouding, i.e. albumen, polyphenols (tannins), heavy metals and carbohydrates. Frequently, however, clouding is caused by one of the constituents which is present in a larger quantity than the balance of the solution allows.

Since albumen is involved in clouding in virtually all cases, the first method adopted was to free the drinks from part of the albuminous substances. This was initially achieved by bentonites in all drinks, and later active silicic acid was instead used for the same purpose, particularly in beer.

It has recently been realised that albumen stabilisation often has to be supplemented by tannin adsorption, for two main reasons. If really long-term stabilisation is to be obtained, so much albuminous substance usually has to be removed from the drink that very large expenses are incurred and the flavour of the drink also suffers. The latter effect is observed particularly in beer, where the stability of the foam is also impaired. However, the same stability can be obtained by removing a small quantity of albumen and simultaneously removing tannins. Furthermore an excessive content of polyphenols also changes the flavour of the drink unfavourably. On the basis of new technologies considerably more tannins are often put into a drink nowadays than was previously the case, particularly in the manufacture of juices and wine. These tannins change the character of the drink and it is therefore desirable to remove them.

Polyamides (nylon and perlon) and polyvinylpyrrolidone were initially used to remove tannins from drinks. All three products are soluble to a greater or lesser degree in the drinks to be treated. The portions dissolved react with the polyphenols and cause them to precipitate. However, a surplus of the precipitating agent always remains dissolved in the drink and is passed on to the consumer. One can still not be absolutely certain that this surplus has no effects which are harmful to health.

In order to avoid this danger polyvinylpolypyrrolidone (PVPP) has recently been developed (German Specification No. 1,282,581). This is a cross-linked polyvinylpyrrolidone which is insoluble in most media because of its high degree of polymerisation.

In the dry state PVPP has a very small specific surface area. The fact that it nevertheless has a very good sorption action relative to polyphenols is due to the fact that it has a certain capacity for swelling in aqueous media and thus enlarges its surface.

A serious drawback of PVPP, however, is that because of its high production costs it has to be regenerated by the consumer after use. The manufacturer recommends regenerating it by boiling with a 10% alkaline solution and 10% acid. The food control authorities in some countries have raised objections to this, since one cannot always adequately ensure that the product will be washed out sufficiently after this treatment and will be in a satisfactorily clean state, appropriate to food, when it is re-used. Apart from the drawback experience shows that there is a loss of activity when PVPP has been regenerated several times.

The problem underlying the invention is therefore how to obtain a sorption agent for removing tannins from juices or fermentation products of vegetable origin, particularly from drinks such as beer or wine, which does not have the disadvantages of known sorption agents used for this purpose. In particular, the sorption agent must on the one hand have the least possible solubility with the greatest possible sorption action and, on the other hand, be so cheap to produce that it can be used commercially without regeneration.

According to the invention the problem is solved by using as the sorption agent highly dispersed condensation polymers of polyamino and/or polyhydroxy compounds and formaldehyde, with specific surface area of over 20 m$^2$/g and with a positive zeta potential in the range from pH 3 to pH 5.

The condensation polymers may of course be used mixed with other substances, particularly drink-treating agents such as active carbon, activated silicic acid or bentonite.

Condensation polymers according to the invention are understood as being polymers or resins obtained by condensing formaldehyde with polyamino or polyhydroxy compounds, such as polyphenols. These may include phenoplasts and aminoplasts based on formaldehyde.

Products which have been found particularly useful are condensation products of formaldehyde with melamine and/or urea and with phenols, which are prepared in known manner, e.g. in accordance with A. Renner "Die makromolekulare Chemie," 120 (1968), pages 68 to 86 and A. Renner "Die makromolekulare Chemie," 149 (1971), pages 1 to 27.

In this group of compounds highly dispersed and cross-linked condensation polymers of melamine and formaldehyde are particularly preferred. Because of the high degree of cross-linking these products are virtually insoluble in the liquids to be treated. In contrast with these, condensaton polymers of formaldehyde and e.g. urea are not cross-linked, although under certain manufacturing conditions they have only very slight solubility.

Because of the relatively low production costs of all these highly dispersed condensation polymers they need not be regenerated; they therefore provide an important contribution to sorption technique in the commerical food-stuffs and luxury food sector.

The sorption agent which is particularly preferred in accordance with the invention can be prepared relatively simply from melamine (2,4,6-triamino-1,3,5-triazine) and formaldehyde as described by A. Renner in "Die makromolekulare Chemie," 120 (1968), pages 68 to 86. By controlling precipitation conditions with the aid of various protective colloids, the surface charge (zeta potential) and also the surface and grain size may be controlled.

Important factors in obtaining the improved results which the sorption agents according to the invention are designed to achieve are, firstly, the specific surface area and, secondly, the surface charge (zeta potentail). The zeta potential depends on the pH and, according to the invention, must be positive in the range from pH 3 to pH 5, since this is generally the treatment range for juices of vegetable origin or fermentation products thereof, such as drinks. The zeta potential in the pH range for treating drinks is preferably at least 5 and particularly at least 30 mV. Ranges which are further preferred for the zeta potential are +5 to 70 and particularly 35 to 45 mV.

Since the sorption agents according to the invention have only a slight capacity for swelling in water, they become more effective as their specific surface areas increase. Their specific surface area is preferably from 20 to 250 m$^2$/g and preferably above 50 m$^2$/g.

The average grain size of the sorption agents according to the invention is desirably from 1 to 50 and preferably from 1 to 10 $\mu$, e.g. about 2 $\mu$.

The advantages of the sorption agents according to the invention over known sorption agents used in the same field may be summarised as follows:

1. In contrast with polyamides such as nylon, perlon or polyvinylpyrrolidone used in known manner, the sorption agents according to the invention are insoluble in the liquid treated, e.g. a drink or the like, and/or are harmless from the point of view of food regulations.

2. In contrast with polyvinylpolypyrrolidone, the sorption agents according to the invention need not be regenerated because of their low production costs. This not only facilitates handling but is also important for reasons of food regulations, since regeneration with alkaline solutions or acids is not harmless from this point of view.

3. The particle-shape and particle-size of the sorption agents according to the invention are extremely favourable to filtration; this shape and size is retained in aqueous media and the particles do not obstruct the filter beds conventionally used in the drinks industry. Polyvinylpolypyrrolidone, in contrast, swells in water and in this swollen state is inclined to block the filters.

4. As compared with known sorption agents those according to the invention have the advantage that their properties may be modified to a very marked degree during manufacture, without any additional cost; their properties can therefore be optimally adjusted according to the liquid to be treated.

5. Particularly in the treatment of beer, the sorption agents according to the invention have not only a tannin-adsorbing action but also an albumen-stabilising action which is stronger than that obtained with the tannin adsorption agents previously known for that purpose.

Technologically the sorption agents according to the invention may be used inter alia for the following processes in the maufacture of drinks: to accelerate maturing and clarifying of fermentation drinks, in the filtraton of fermentation drinks (the sorption agents being added during passage through the filter), for which the sorption agents according to the invention are particularly well-suited; in the crushing process (brewing), combined with activated silicic acids (albumen stabilising agents) or enzymes; in boiling the wort (brewing); in mashing (brewing); before or during fermentation in wine production; in the treatment of new and matured wine; and in the removal of an excessive tannin content from fruit juices.

The examples which follow provide a further explanation of the invention and demonstrate the sorption action of some sorption agents according to the invention on polyphenols.

For the following examples 6 different melamine formaldehyde resins were prepared, exactly as specified in A. Renner "Die makromolekulare Chemie," 120 (1968), pages 68 to 86 for product $a$, under different precipitating conditions. Only the protective colloid was varied. In the table which follows the quantity of protective colloid is in each case given as a percentage of the final product.

The CMC used was Antisol HS from Messrs. Wolff Walsrode. Polyvinylalcohol was obtained from Schuchard (BO 096), and the gelatine used was from Merk, No. 4072.

Table I

| | | Melamine formaldehyde resins. | | | |
|---|---|---|---|---|---|
| | | Specific surface area | Average grain size | Zeta potential, mV | |
| No. | Protective colloid | m$^2$/g | $\mu$ | pH 4.5 | pH 3.5 |
| 1 | 2% CMC | 36.4 | 5 | +25.0 | +41.0 |
| 2 | 8% CMC | 104.5 | 2 | +36.0 | +38.0 |
| 3 | 2% PVA | 25.9 | 10 | +41.0 | +40.0 |
| 4 | 8% PVA | 56.2 | 5 | +37.0 | +40.0 |
| 5 | 2% gelatine | 72.6 | 5 | +38.0 | +41.0 |
| 6 | 8% gelatine | 121.2 | 2 | +34.0 | +36.0 |

In the examples described below the action of these 6 resins on beer, wine and a wine-like model solution is tested. In the case of beer the reduction in the anthocyanogen content is measured, since the polyphenols present in beer are preponderantly anthocyanogens and this value can therefore be taken as representative for all polyphenols. With wines and juices the position is different; here only 20 to 40% of all polyphenols are anthocyanogens, so a method for measuring all the polyphenols is applied. This consists of defining the polyphenols by their blue colour with the Folin-Ciocalteux test ("Die Wein-Wissenschaft," 29, 1974, volume 5, pages 241 to 253).

To enable the values to be compared the same quantities are used throughout, even in the case of PVPP and Nylon 66 which are used for the sake of comparison.

In example 5, in order to bring out the fact that it is not only the above-mentioned highly dispersed and cross-linked MF resins that can be used according to the invention but that other formaldehyde condensation polymers are also suitable for the purpose, test results are given for a commercially available highly dispersed urea formaldehyde resin (UF resin).

EXAMPLE 1

100 ml of beer is in each case shaken for 1 hour with 100 mg of the treating agent, then filtered and examined. As well as the reduction in the anthocyanogen content, as a percentage of the value in untreated beer, the ammonium sulphate precipitation limit is ascertained (in ml of saturated ammonium sulphate solution). This is known to be a measure of the albumen stability of beer. The values show that sorption agents according to the invention have a certain albumen-stabilising action. The ammonium sulphate precipitation limit in untreated beer is approximately 1.50 ml.

Table II

| | Application to beer | |
|---|---|---|
| | Reduction in anthocyanogen | Ammonium sulphate precipitation limit |
| Product | % | ml |
| 1 | 19 | 2.70 |

Table II-continued

| | Application to beer | |
|---|---|---|
| Product | Reduction in anthocyanogen % | Ammonium sulphate precipitation limit ml |
| 2 | 40 | 1.85 |
| 3 | 35 | 1.90 |
| 4 | 43 | 2.30 |
| 5 | 46 | 2.00 |
| 6 | 57 | 2.35 |
| Nylon 66 (Polyhexamethylene adipamide) | 15 | 1.80 |

EXAMPLE 2

25 mg of resin No. 2 and of PVPP to every 100 ml of wort with 12% extract is added to a fully hopped wort, after which the wort is boiled for 2 hours. The anthocyanogen content of the treated wort and of the untreated but boiled wort is measured. There is a very considerable difference between PVPP and the sorption agent according to the invention.

Table III

| Application to beer wort | |
|---|---|
| Product | Reduction in anthocyanogen % |
| Test product 2 | 71 |
| PVPP | 29 |

EXAMPLE 3

An Italian white wine, very rich in tannin, is treated with the sorption agents according to the invention and with Nylon 66. The total polyphenol content of the wine is 680 mg/l and the anthocyanogen content 195 mg/l. Here again 100 ml wine is in each case shaken for 1 hour with 100 mg of the treating agent, then filtered. The results are set out in Table IV.

Table IV

| Application to wine | |
|---|---|
| Product | Reduction in polyphenol % |
| 1 | 15 |
| 2 | 20 |
| 3 | 12 |
| 4 | 16 |
| 5 | 10 |
| 6 | 18 |
| Nylon 66 | 7 |

EXAMPLE 4

A wine-like model solution containing tannin is treated with the sorption agents according to the invention and with Nylon 66. The model solution is prepared as follows: a 10% solution of alcohol in water, containing 5 g/liter of malic acid is set to pH 3.5 with potassium carbonate. 500 mg gelatine (Goldblatt-Gelatine supplied by Merck) is first dissolved in this solution, then 500 mg tannin is added. The solution is stirred for about 1 hour, then the deposit is filtered off (the albumen and tannin form a deposit until the solution has established an equilibrium).

The final solution has a tannin content of 182.4 mg/liter. 100 mg of the sorption agent is again added to every 100 ml of solution, and the solution is shaken for 1 hour then filtered.

Table V

| Application to model solution | |
|---|---|
| Product | Reduction in polyphenol % (reduction in tannin) |
| 1 | 23.4 |
| 2 | 35.9 |
| 3 | 31.7 |
| 4 | 41.5 |
| 5 | 27.8 |
| 6 | 39.3 |
| Nylon 66 | 19.5 |

EXAMPLE 5

The commercial product Pergopak M (manufacturer Ciba-Geigy AG) is tested as an example of a urea formaldehyde condensation polymer (UF resin). According to data supplied by the manufacturer this product is a condensation polymer from urea and formaldehyde, which is virtually free of any inorganic substances. The size of the primary particles, which are approximately spherical, is 0.1 $\mu$. The primary particles are agglomerated into particules approximately 4 to 6 $\mu$ in size. In this date the manufacturer refers to tests by A. Renner "Die makromolekulare Chemie," 149 (1971), pages 1 to 27.

Of the other data supplied by the manufacturer the specific surface area is also of importance to the tests carried out here; this is given as at least 20 m$^2$/g. The sample examined was found to measure 25.6 m$^2$/g. The zeta potential was +20.0 mV at pH 3.5 and +15.5 mV at pH 4.5.

The tannin-adsorbing action of Pergopak M, in a wine-like, tannin-containing model solution with 533 mg tannin/liter, is compared with resin No. 1.

Table VI

| Product | Reduction in polyphenol 4 |
|---|---|
| MF resin. Test product No.1 | 17.8 |
| Pergopak M | 13.9 |

One must consider that, with urea formaldehyde resins too, manufacturing conditions vary widely and their manufacture can undoubtedly be directed to the special application of tannin adsorption as in the case of melamine formaldehyde resins. The product Pergopak M is produced as a white pigment for paper manufacture and therefore cannot be expected to have optimum properties for the purpose tested here.

I claim:

1. A method of removing tannins from liquid fruit drinks, vegetable drinks, and fermented liquids of vegetable and fruit origin which comprises contacting the liquid with at least one highly dispersed polymer insoluble in the liquid and for a time sufficient to absorb the tannins and reduce clouding in the liquid, the polymer being obtained by condensing a monomer selected from the group consisting of polyamino compounds, polyhydroxy compounds and mixtures thereof, with formaldehyde, said polymer being further characterized as having a specific surface area of at least 20m$^2$/g and a positive zeta potential in a solution having a pH of from 3 to 5, and subsequently separating the polymer from the contacted liquid.

2. A method according to claim 1, wherein the highly dispersed polymer is obtained by the condensation of melamine with formaldehyde.

3. A method according to claim 1, wherein the highly dispersed polymer is characterized as having a specific surface area of from 20 to 250 m²/g.

4. A method according to claim 3, wherein the highly dispersed polymer is characterized as having a specific surface area of over 50 m²/g.

5. A method according to claim 1, wherein the highly dispersed polymer is characterized as having an average grain size of from 1 to 50 μ.

6. A method according to claim 5, wherein the highly dispersed polymer is characterized as having an average grain size of from 1 to 10 μ.

7. A method according to claim 1, wherein the highly dispersed polymer is characterized as having a zeta potential of at least +5mV in a solution having a pH of from 3 to 5.

8. A method according to claim 7 wherein the highly dispersed polymer is characterized as having a zeta potential of +5 to +70mV in a solution having a pH of from 3 to 5.

9. A method according to claim 7, wherein the highly dispersed polymer is characterized as having a zeta potential of at least +30mV in a solution having a pH of from 3 to 5.

10. A method according to claim 9, wherein the highly dispersed polymer is characterized as having a zeta potential of +35 to +45mV in a solution having a pH of from 3 to 5.

* * * * *